United States Patent
Propp

(10) Patent No.: US 9,456,288 B2
(45) Date of Patent: Sep. 27, 2016

(54) SYSTEM AND METHOD FOR USE IN ANALYZING VIBRATIONS

(71) Applicant: Regal Beloit America, Inc., Beloit, WI (US)

(72) Inventor: Christopher Edwin Eugene Propp, Wausau, WI (US)

(73) Assignee: Regal Beloit America, Inc., Beloit, WI (US)

( * ) Notice: Subject to any disclaimer, the term of this patent is extended or adjusted under 35 U.S.C. 154(b) by 112 days.

(21) Appl. No.: 14/506,098

(22) Filed: Oct. 3, 2014

(65) Prior Publication Data

US 2016/0100266 A1    Apr. 7, 2016

(51) Int. Cl.
*H04R 29/00* (2006.01)
*G01M 15/12* (2006.01)

(52) U.S. Cl.
CPC .............. *H04R 29/00* (2013.01); *G01M 15/12* (2013.01)

(58) Field of Classification Search
None
See application file for complete search history.

(56) References Cited

U.S. PATENT DOCUMENTS

| | | |
|---|---|---|
| 3,454,766 A | 7/1969 | Roughton |
| 5,934,610 A | 8/1999 | Karolys et al. |
| 6,370,957 B1 | 4/2002 | Filippenko et al. |
| 6,386,042 B2 | 5/2002 | Wortge et al. |
| 7,133,801 B2 | 11/2006 | Song |
| 7,409,302 B2 | 8/2008 | Kok et al. |
| 7,805,281 B2 | 9/2010 | Leigh |
| 8,219,361 B2 | 7/2012 | Leigh |
| 8,400,145 B2 | 3/2013 | Jacobs |
| 8,692,101 B2 * | 4/2014 | Ryle ........................ G10H 1/053 84/622 |
| 2003/0159570 A1 * | 8/2003 | Toshitani ............. G10H 1/0058 84/645 |
| 2008/0225274 A1 * | 9/2008 | Hirata ...................... G01H 9/00 356/73 |
| 2014/0069195 A1 | 3/2014 | Ledbetter |

* cited by examiner

*Primary Examiner* — Muhammad N Edun
(74) *Attorney, Agent, or Firm* — Armstrong Teasdale LLP

(57) ABSTRACT

A system for use in analyzing vibrations of an electrical machine is provided. The system includes a conversion computing device including at least one processor. The conversion computing device is configured to receive at least one analog vibration signal representing vibrations associated with an electrical machine, convert the at least one analog vibration signal to audio data, and transmit the audio data to an analysis computing device.

19 Claims, 5 Drawing Sheets

SYSTEM AND METHOD FOR USE IN ANALYZING VIBRATIONS

BACKGROUND

The field of the disclosure relates generally to analyzing vibrations, and more particularly, to systems and methods that convert analog vibration signals to audio data for analysis.

At least some known systems for analyzing vibrations associated with a machine, such as a motor, require specialized vibration analysis hardware and/or software. Such software and/or hardware is relatively expensive, costing between $500 to $2,500 for each "channel" or vibration signal to be analyzed. Moreover, in many such systems, the hardware is not portable, requiring machines to be brought to the specialized hardware for analysis, rather than taking the hardware to the machines. Furthermore, in many known systems, the specialized software is not compatible with other analysis software. Accordingly, manufacturers and/or technical support personnel may be locked into using a first vibration analysis system and be unable to use potentially useful features of a second vibration analysis system that is incompatible with the first vibration analysis system. It would be beneficial to have a system that converts vibration signals to a form of data that a wide variety of relatively low-cost hardware and software is configured to analyze, such as audio data.

BRIEF DESCRIPTION

In one aspect, a system for use in analyzing vibrations of an electrical machine is provided. The system includes a conversion computing device including at least one processor. The conversion computing device is configured to receive at least one analog vibration signal representing vibrations associated with an electrical machine, convert the at least one analog vibration signal to audio data, and transmit the audio data to an analysis computing device.

In another aspect, a method for use in analyzing vibrations of an electrical machine is provided. The method is implemented by a conversion computing device including at least one processor. The method includes receiving, by the conversion computing device, at least one analog vibration signal representing vibrations associated with an electrical machine. The method additionally includes, converting, by the conversion computing device, the analog vibration signal to audio data. Additionally, the method includes transmitting, by the conversion computing device, the audio data to an analysis computing device.

In another aspect, a computer-readable storage device having computer-executable instructions embodied thereon is provided. When executed by a computing device having one or more processors, the computer-executable instructions cause the computing device to receive at least one analog vibration signal representing vibrations associated with an electrical machine, convert the at least one analog vibration signal to audio data, and transmit the audio data to an analysis computing device.

DETAILED DESCRIPTION

Implementations of the systems and methods described herein receive vibration signals from one or more vibration sensors associated with a machine. In at least some implementations, the machine includes an electrical machine. More specifically, in at least some implementations, the electrical machine includes a rotating electrical machine, for example an electrical motor or generator. The systems and methods convert the vibration signals to audio data and transmit the audio data to an analysis computing device, for example over a Universal Serial Bus (USB) connection. The analysis computing device, which may be, for example, a smart phone, analyzes the audio data and determines an operational status of the motor. In some instances, the analysis computing device determines that at least one feature of the motor, such as a bearing, requires replacement or other maintenance. In some implementations, rather than making the determination itself, the analysis computing device transmits the audio data to a remote server computing device, for example at a manufacturer's facility. The server computing device performs the analysis of the audio data and transmits responsive data back to the analysis computing device. The responsive data includes, for example, a description of a maintenance action to be performed on the motor.

In one implementation, a computer program is provided, and the program is embodied on a computer-readable medium. In an example implementation, the computer program is executed on a single computing device, without requiring a connection to a server computer. The computer program is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
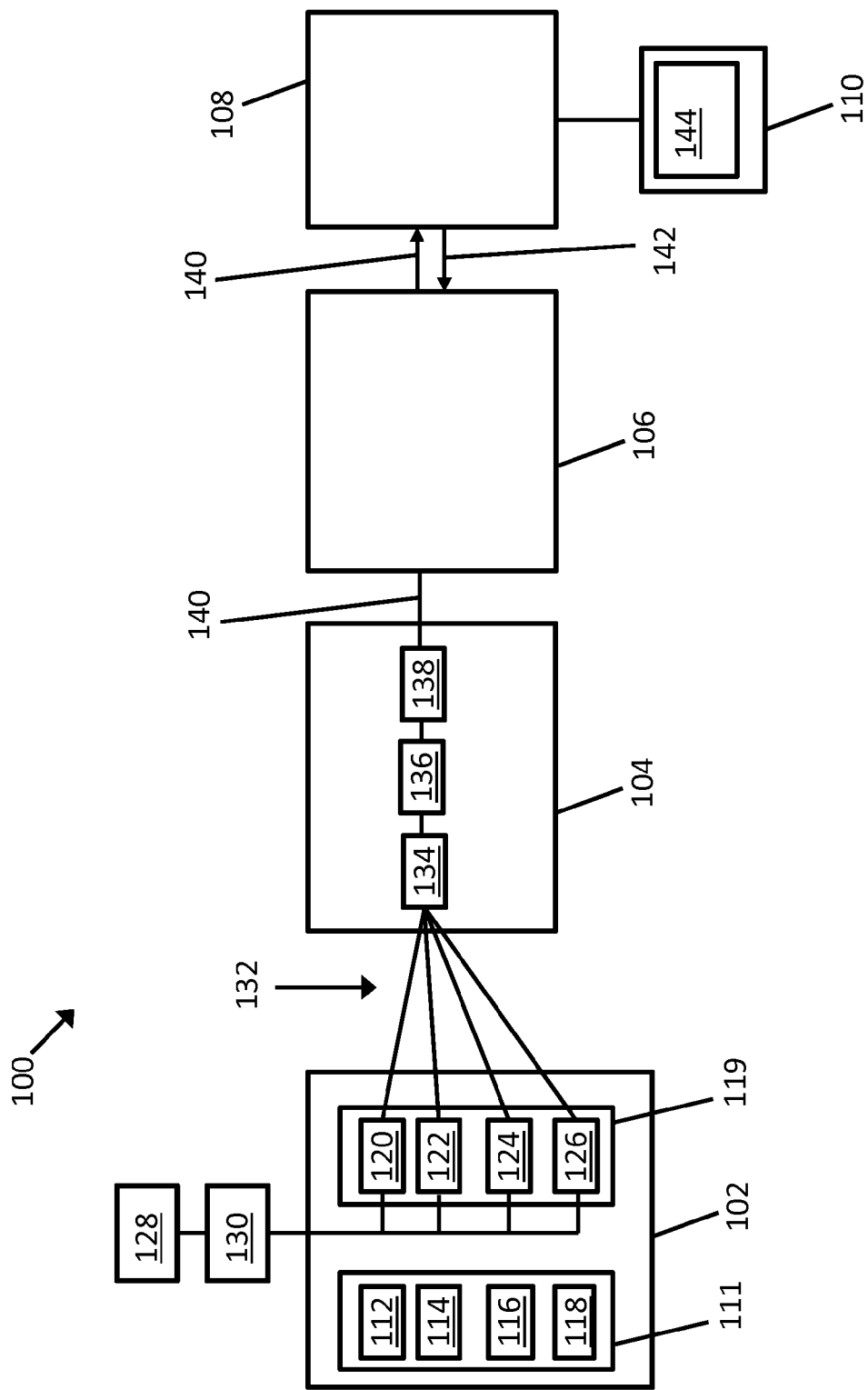
FIG. 1 is a block diagram of an example system for use in analyzing vibrations.

FIG. 1 is a block diagram of an example system 100 for use in analyzing vibrations. More specifically, system 100 enables analyzing vibrations of a machine 102, for example a motor. System 100 includes a conversion computing device 104 coupled to an analysis computing device 106. In some implementations, conversion computing device 104 and analysis computing device 106 are integrated together as a single computing device. In at least some implementations, analysis computing device 106 is coupled to a server computing device 108. Server computing device 108 is coupled to a database 110. In some implementations, database is included within server computing device 108. Additionally, in some implementations, server computing device 108 is remote to analysis computing device 106, but is in communication with analysis computing device 106 through the Internet or other network, as described herein.

Machine 102 includes a plurality of features 111, including a first feature 112, a second feature 114, a third feature 116, and a fourth feature 118. In other implementations, machine 102 includes a different number of features than four. In at least some implementations, vibrations associated with features 111 are indicative of an operational status of features 111. For example, in some instances, vibrations associated with first feature 112 indicate that first feature 112 is operating according to predefined specifications while vibrations associated with second feature 114 indicate that second feature 114 is not operating according to predefined specifications. In other words, in such instances, the operation of second feature 114 is abnormal and may require corrective action (e.g., repair or replacement). In some implementations, first feature 112 is a rotor, second feature 114 is a bearing, third feature 116 is an air gap, and fourth feature 118 is a mounting of machine 102 (e.g., a motor).

A plurality of vibration sensors 119 measure vibrations associated with one or more of first feature 112, second feature 114, third feature 116, and fourth feature 118. For example, in some implementations, a first vibration sensor 120 measures vibrations associated with first feature 112, a second vibration sensor 122 measures vibrations associated with second feature 114, a third vibration sensor 124 measures vibrations associated with third feature 116, and a fourth vibration sensor 126 measures vibrations associated with fourth feature 118. In some implementations, one or more of vibration sensors 119 is an integrated circuit piezoelectric (ICP) accelerometer. In some implementations, a power source 128, for example a battery, is coupled to vibration sensors 119. In some implementations, a voltage multiplier 130 is coupled to power source 128 and vibration sensors 119 and increases a first voltage provided by power source 128 to a second voltage that voltage multiplier 130 provides to vibration sensors 119. Each of first vibration sensor 120, second vibration sensor 122, third vibration sensor 124, and fourth vibration sensor 126 transmits a corresponding analog vibration signal 132 (i.e., an analog electrical signal) representing measurements of vibrations in corresponding features 111 to conversion computing device 104.

Conversion computing device 104 includes a signal conditioner 134 that performs one or more conditioning operations on analog vibration signals 132. For example, in some implementations, signal conditioner 134 removes a direct current offset from one or more of analog vibration signals 132. In some implementations, signal conditioner 134 performs one or more of scaling, bandpass filtering, and buffering on one or more of analog vibration signals 132. Signal conditioner 134 transmits a conditioned version of analog vibration signals 132 to an audio analog-to-digital converter (ADC) 136. Audio ADC 136 converts analog vibration signals 132 to digital audio data 140 (hereinafter "audio data"). Audio ADC 136 transmits audio data 140 to an audio transmitter 138. Audio transmitter 138 transmits audio data 140 to analysis computing device 106. In some implementations, audio ADC 136 transmits audio data 140 in a first format (e.g., I2S format) and audio transmitter 138 converts audio data 140 to a second format (e.g., universal serial bus (USB) 2.0 audio) and transmits audio data 140 in the second format. Accordingly, in such implementations, conversion computing device 104 is coupled to analysis computing device 106 using a network bus that supports the second format. For example, in implementations in which audio transmitter 138 transmits audio data 140 to analysis computing device 106 using the USB 2.0 audio format, conversion computing device 104 is coupled to analysis computing device 106 by a bus that supports the USB 2.0 audio protocol (e.g., a USB 2.0 or higher connection).

Analysis computing device 106 receives audio data 140 and performs one or more audio analysis operations using audio data 140. For example, in some implementations, analysis computing device 140 receives audio data 140 as a stream and stores audio data 140 in a file in memory. In some implementations, analysis computing device 106 determines one or more characteristics of audio data 140, for example one or more amplitudes, frequencies, and/or patterns in audio data 140. In some implementations, analysis computing device 106 compares audio data 140 to one or more sets of reference audio data, wherein each set of reference audio data is associated with a particular operational status of a feature (e.g., features 111) of machine 102. In some implementations, analysis computing device 106 determines at least one operational status of one or more features 111 based on such comparisons. Additionally, in some implementations, analysis computing device 106 outputs (e.g., displays or otherwise presents) a recommended maintenance action associated with the operational status of a feature 111. In some implementations, analysis computing device 106 transmits audio data 140, for example in an audio file, to server computing device 108. Server computing device 108 then transmits responsive data 142 to analysis computing device 106. For example, responsive data 142 may include a recommended corrective action for one or more features 111 of machine 102. In some implementations, server computing device 108 compares audio data 140, characteristics of audio data, and/or an operational status of one or more features 111 associated with audio data 140 to reference data 144 in database 110. Reference data 144 includes, for example, one or more reference audio data sets 409 (FIG. 4), descriptions of technical problems (operational statuses), and associated technical solutions (e.g., maintenance actions).

Figure 2:
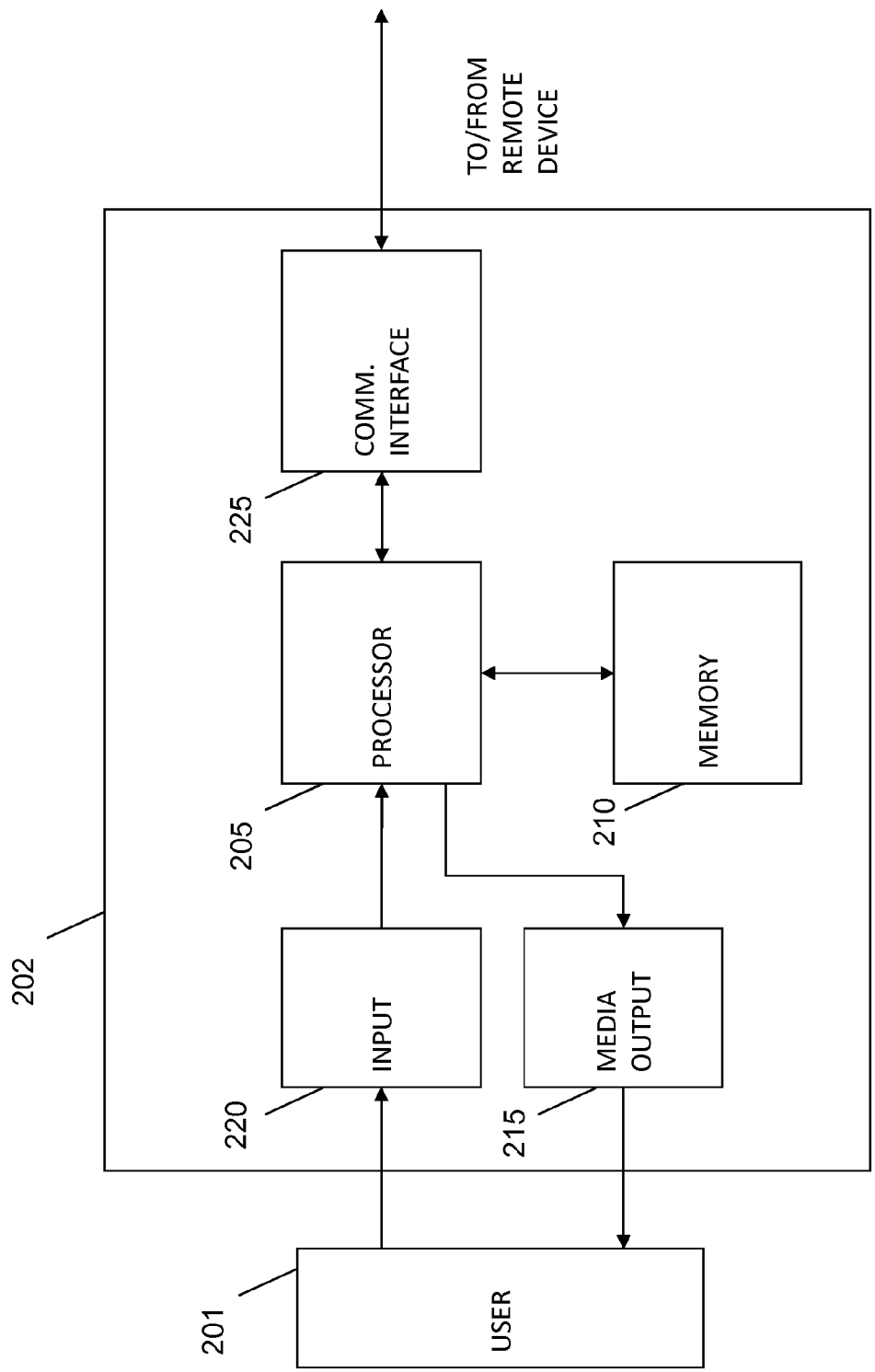
FIG. 2 is a block diagram of an example client computing device included in the system shown in FIG. 1.

FIG. 2 illustrates an example configuration of a client computing device 202 operated by a user 201. Client computing device 202 is representative of conversion computing device 104 and analysis computing device 106. More specifically, conversion computing device 104 and analysis computing device 106 include one or more components of client computing device 202. Client computing device 202 includes one or more processors 205 for executing instructions. In some embodiments, executable instructions are stored in a memory area 210. Processor 205 may include one or more processing units (e.g., in a multi-core configuration). One or more memory devices 210 are any one or more devices allowing information such as executable instructions and/or other data to be stored and retrieved. One or more memory devices 210 may include one or more computer-readable media.

Client computing device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device or an audio output device (e.g., a speaker or headphones). The display device may be, for example, a liquid crystal display (LCD), organic light emitting diode (OLED) display, cathode ray tube (CRT), or "electronic ink" display.

In some embodiments, client computing device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, an audio input device, a camera or other visual sensor, a barcode scanner, a magnetic sensor, and/or an radio frequency sensor. A single component such as a touch screen may function as both an output device of media output component 215 and input device 220.

Client computing device 202 may also include a communication interface 225, which is communicatively couplable to remote devices such as server computing device 108. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in one or more memory devices 210 are, for example, computer-readable instructions for providing a user interface to user 201 via media output component 215 and, optionally, receiving and processing input from input device 220. A user interface may display information to user 201 and/or enable user 201 to enter information into client computing device 202.

Figure 3:
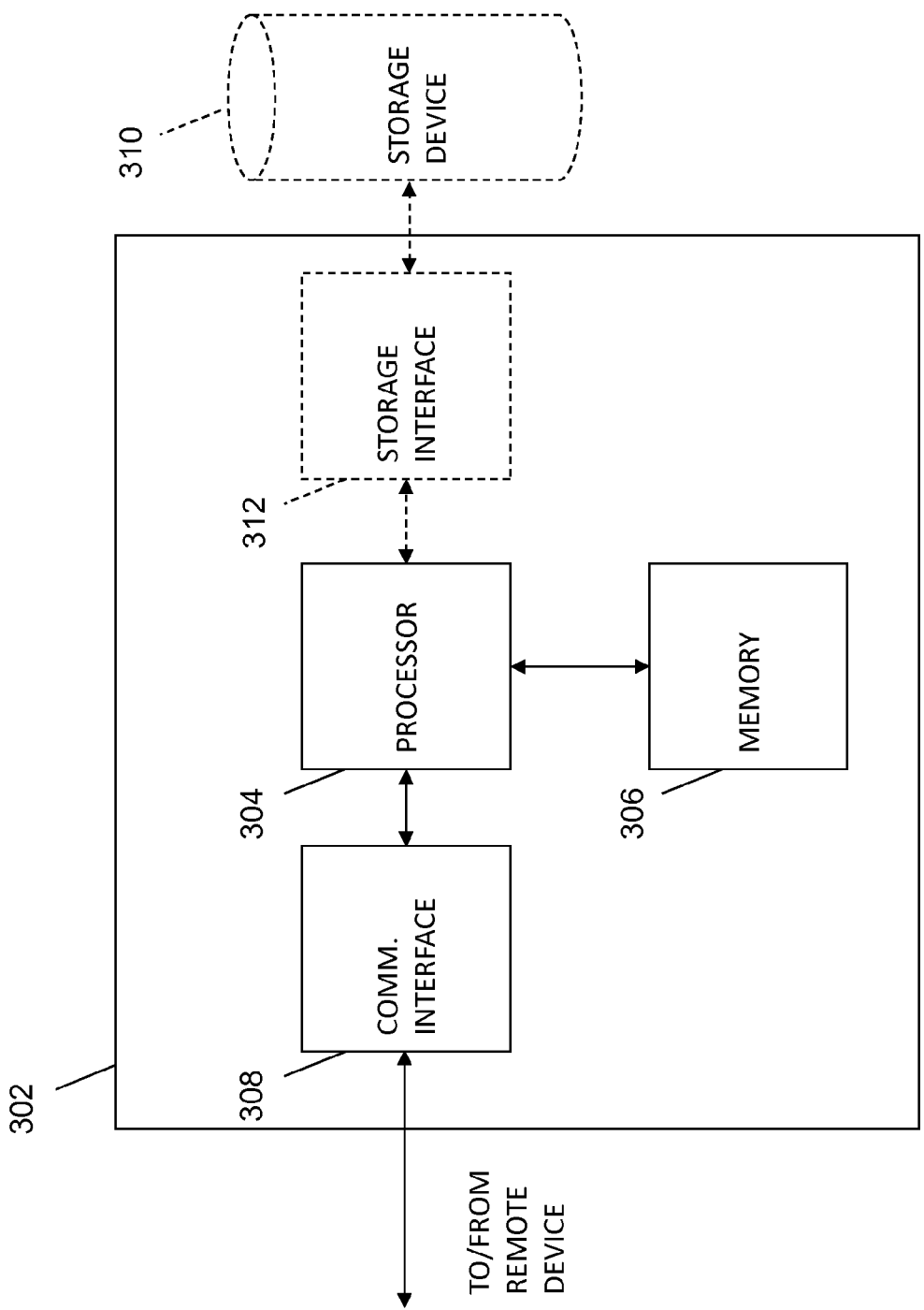
FIG. 3 is a block diagram of an example server computing device that communicates with a client computing device included in the system shown in FIG. 1.

FIG. 3 illustrates an example configuration of a server computing device 302 such as server computing device 108 (shown in FIG. 1). Server computing device 302 includes one or more processors 304 for executing instructions. Instructions may be stored in one or more memory devices 306. One or more processors 304 may include one or more processing units (e.g., in a multi-core configuration).

One or more processors 304 are operatively coupled to a communication interface 308 such that server computing device 302 is capable of communicating with a remote device such as client computing device 202 or another server computing device 302. For example, communication interface 308 may receive data (e.g., audio data 140) from analysis computing device 106 via the Internet or another network.

One or more processors 304 may also be operatively coupled to one or more storage devices 310. One or more storage devices 310 are any computer-operated hardware suitable for storing and/or retrieving data. In some embodiments, one or more storage devices 310 are integrated in server computing device 302. For example, server computing device 302 may include one or more hard disk drives as one or more storage devices 310. In other embodiments, one or more storage devices 310 are external to server computing device 302 and may be accessed by a plurality of server computing devices 302. For example, one or more storage devices 310 may include multiple storage units such as hard disks or solid state disks in a redundant array of inexpensive disks (RAID) configuration. One or more storage devices 310 may include a storage area network (SAN) and/or a network attached storage (NAS) system. In some embodiments, one or more storage devices 310 include database 110.

In some embodiments, one or more processors 304 are operatively coupled to one or more storage devices 310 via a storage interface 312. Storage interface 312 is any component capable of providing one or more processors 304 with access to one or more storage devices 310. Storage interface 312 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing one or more processors 304 with access to one or more storage devices 310.

One or more memory devices 210 and 306 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 4:
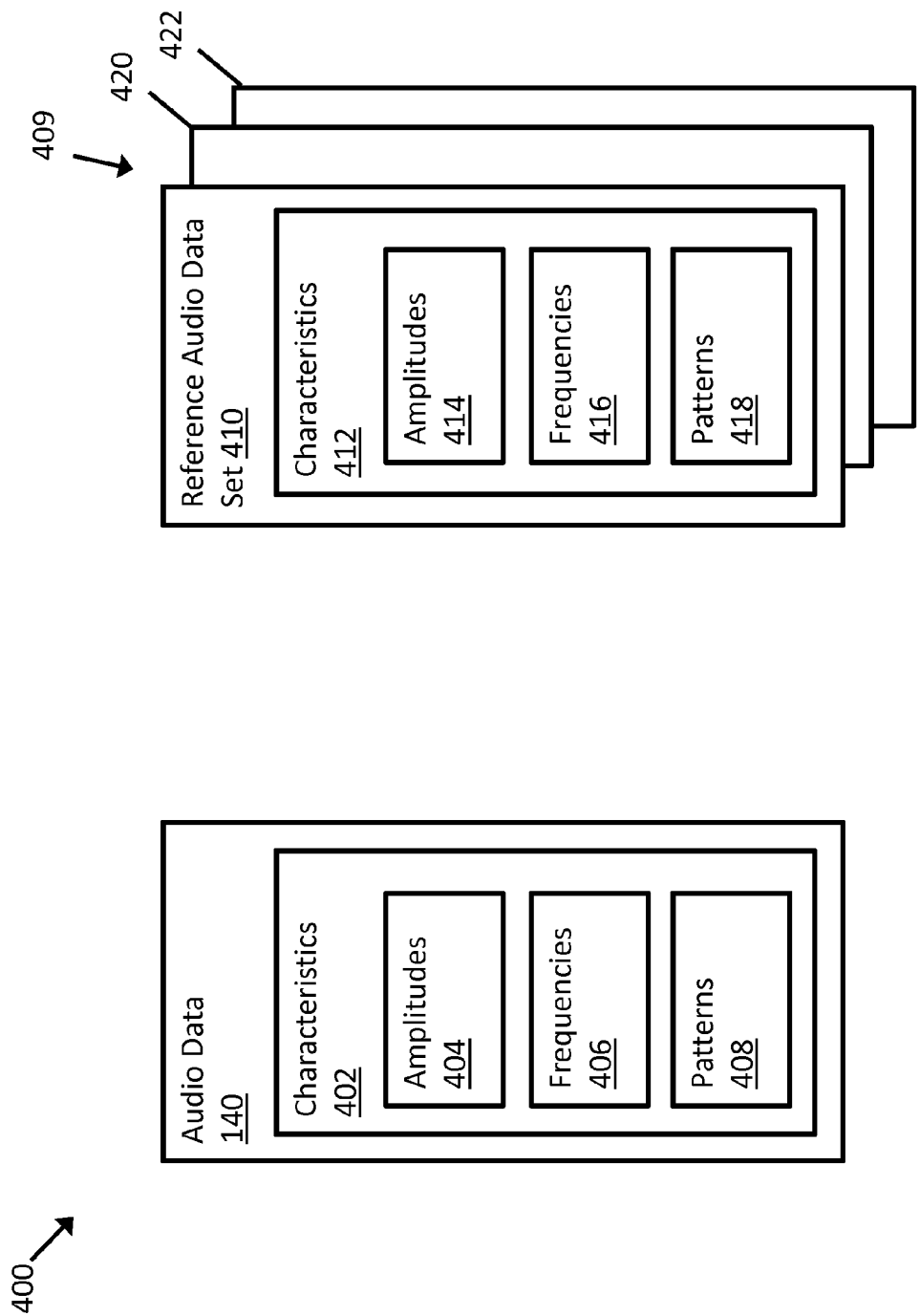
FIG. 4 is a block diagram of a relationship between audio data generated by the system shown in FIG. 1 and reference audio data.

FIG. 4 is a block diagram of a relationship 400 between audio data 140 generated by system 100 and sets 409 of reference audio data, including a first reference audio data set 410, a second reference audio data set 420, and a third reference audio data set 422. Audio data 140 includes characteristics 402. Characteristics 402 include one or more amplitudes 404, such as amplitudes at particular points in time in audio data 140, an average amplitude, and a peak amplitude. Characteristics 402 additionally include frequencies 406. For example, in some implementations, analysis computing device 106 performs a frequency analysis, such as a Fourier transform or a fast Fourier transform (FFT) and identifies frequencies 406 present in audio data 140. In some implementations, amplitudes 404 include amplitudes of one or more frequencies 406 in audio data 140. Additionally, characteristics 402 include patterns 408, such as repeating sounds that are present in audio data 140. In at least some implementations, analysis computing device 106 identifies characteristics 402 in audio data 140 and compares one or more characteristics 402 to characteristics associated with each of reference audio data sets 409. For example, first reference audio data set 410 has characteristics 412 that include one or more amplitudes 414, one or more frequencies 416, and/or one or more patterns 418. First reference audio data set 410 is associated, in memory 210, with a particular operational status of machine 102. More specifically, first reference audio data set 410 is associated, in memory 210, with a failed bearing (e.g., second feature 114). Similarly, second reference audio data set 420 is associated with an imbalanced rotor (e.g., first feature 112). Additionally, third reference audio data set 422 is associated, in memory 210, with normal operation of machine 102, in which all features 111 are operating according to predefined specifications.

Analysis computing device 106 compares audio data 140, and more specifically characteristics 402, to characteristics (e.g., characteristics 412) of reference audio data sets 409, detects a similarity (i.e., a numeric difference that is less than a predefined threshold) between characteristics 402 and characteristics (e.g., characteristics 412) of one or more of reference audio data sets 409, and determines the operating condition of machine 102 based on the comparison. For example, in some implementations, analysis computing device 106 determines that audio data 140 includes a frequency 406 at a particular amplitude 404 that matches a frequency 416 and amplitude 414 in characteristics 412 of first reference audio data set 410. Accordingly, analysis computing device 106 determines that a bearing (e.g., second feature 114) in machine 102 has failed. In some implementations, analysis computing device 106 transmits audio data 140 to server computing device 108 to perform the analysis described above.

Figure 5:
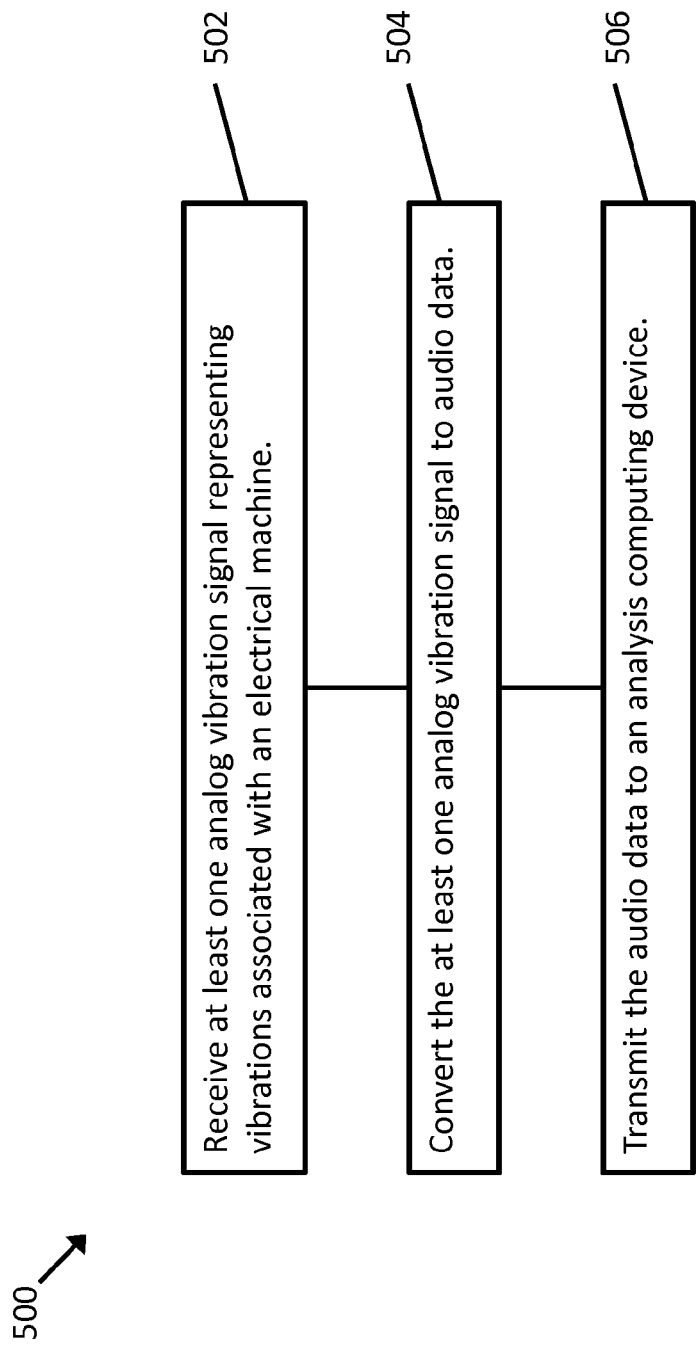
FIG. 5 is a flow chart of an example process performed by the system shown in FIG. 1 in accordance with one aspect of the present disclosure.

FIG. 5 is a flow chart of an example process 500 performed by system 100 for use in analyzing vibrations of machine 102, for example an electrical machine. Initially, system 100, and more specifically conversion computing device 104, receives 502 at least one analog vibration signal (e.g., analog vibration signals 132) representing vibrations associated with an electrical machine (e.g., machine 102). Additionally, system 100, and more specifically conversion computing device 104, converts 504 the at least one analog vibration signal (e.g., analog vibration signals 132) to audio data (e.g., audio data 140). Additionally, system 100, and more specifically conversion computing device 104, transmits 506 the audio data (e.g., audio data 140) to an analysis computing device (e.g., analysis computing device 106).

In some implementations, conversion computing device 104 transmits audio data 140 using a Universal Serial Bus (USB) protocol. For example, in some implementations, conversion computing device 104 transmits audio data 140 according to the USB audio class 2.0 specification. In some implementations, conversion computing device 104 encodes audio data 140 using up to 85 channels at 24 kilohertz. In some implementations, conversion computing device 104 receives the at least one analog vibration signal (e.g., analog vibration signals 132) from at least one vibration sensor (e.g., vibration sensors 119) and encodes each analog vibration signal 132 into a corresponding channel of audio data 140. In some implementations, conversion computing device 104 removes a direct current voltage (VDC) offset signal from the at least one analog vibration signal (e.g., analog vibration signals 132). In some implementations, conversion computing device 104 scales the at least one analog vibration signal (e.g., analog vibration signals 132). In some implementations, conversion computing device 104 filters at least one frequency band from the at least one analog vibration signal (e.g., analog vibration signals 132). In some implementations, conversion computing device 104 buffers the at least one analog vibration signal (e.g., analog vibration signals 132).

System 100, in at least some implementations, includes a power source (e.g., power source 128), such as a battery, that provides power to one or more of vibration sensors 119. In some implementations, system 100 additionally includes a voltage multiplier (e.g., voltage multiplier 130) that is coupled to the power source (e.g., power source 128) and one or more of vibration sensors 119. The voltage multiplier (e.g., voltage multiplier 130) receives a first voltage from the power source (e.g., power source 128) and outputs a second voltage that is greater than the first voltage to one or more of vibration sensors 119.

In some implementations, system 100 includes analysis computing device 106. In some implementations, analysis computing device 106 receives audio data 140 from conversion computing device 104 and determines at least one condition (i.e., operational status) of the electrical machine (e.g., machine 102) from audio data 140. For example, analysis computing device 106 may determine that a bearing (i.e., second feature 114) has failed based on comparing audio data 140 to reference audio data sets 409, as described above. In some implementations, analysis computing device 106 performs a Fourier transform on audio data 140, for example to identify amplitudes 404 of one or more frequencies 406 in audio data 140. In some implementations, analysis computing device 106 performs a transfer function on audio data 140, for example for impact testing. In some implementations, analysis computing device 106 is configured to detect an abnormality in at least one of a rotor (e.g., first feature 112), a bearing (e.g., second feature 114), an air gap (third feature 116), a mounting (e.g., fourth feature 118), and/or an amount of mechanical tightness of an electrical machine (e.g., machine 102). In some implementations, analysis computing device 106 transmits audio data 140 to a server computing device (e.g., server computing device 108) and receives responsive data (e.g., responsive data 142) from the server computing device (e.g., server computing device 108). The responsive data (e.g., responsive data 142), in at least some implementations, indicates a maintenance action for the electrical machine (e.g., machine 102), such as replacing a bearing (e.g., second feature 114).

The methods and systems described herein may be implemented using computer programming or engineering techniques including computer software, firmware, hardware or any combination or subset thereof, wherein the technical effect may include at least one of: (a) receiving at least one analog vibration signal representing vibrations associated with an electrical machine; (b) converting the at least one analog vibration signal to audio data; and (c) transmitting the audio data to an analysis computing device.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media,"

however, do not include transitory signals (i.e., they are "non-transitory"). The term "machine-readable signal" refers to any signal used to provide machine instructions and/or data to a programmable processor.

As compared to known systems and methods for analyzing vibrations associated with a machine, the systems and methods described herein enable less expensive analysis of the vibrations, and diagnosis of the machine, by first converting vibration signals generated by one or more vibration sensors to audio data.

Exemplary embodiments of systems and methods for analyzing vibrations are described herein. The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in analyzing vibrations of an electric motor said system comprising:
   at least one vibration sensor coupled to the electric motor and configured to measure vibrations associated with at least one feature of the electric motor and generate at least one analog vibration signal based on the measured vibration information, the vibrations indicative of an operational status of the at least one feature; and
   a conversion computing device including at least one processor, said conversion computing device configured to:
      receive the at least one analog vibration signal generated by said at least one vibration sensor;
      convert the at least one analog vibration signal to audio data that includes the measured vibration information; and
      transmit the audio data to an analysis computing device.

2. The system of claim 1, wherein said conversion computing device is further configured to transmit the audio data using a Universal Serial Bus (USB) protocol.

3. The system of claim 1, wherein said conversion computing device is further configured to remove a direct current offset signal from the at least one analog vibration signal.

4. The system of claim 1, wherein said conversion computing device is further configured to at least one of scale the at least one analog signal, filter out at least one frequency band from the at least one analog signal, and buffer the at least one analog signal.

5. The system of claim 1, further comprising a battery, a voltage multiplier coupled to said battery, and at least one vibration sensor coupled to said voltage multiplier, the electric motor, and said conversion computing device.

6. The system of claim 1, wherein the at least one analog vibration signal is a plurality of analog vibration signals, and said conversion computing device is further configured to convert each of the analog vibration signals to a corresponding channel of the audio data.

7. The system of claim 1, further comprising said analysis computing device, wherein said analysis computing device is configured to determine at least one condition of the electric motor from the audio data.

8. The system of claim 1, further comprising said analysis computing device, wherein said analysis computing device is further configured to perform a Fourier transform on the audio data.

9. The system of claim 1, further comprising said analysis computing device, wherein said analysis computing device is further configured to perform a transfer function on the audio data.

10. The system of claim 1, further comprising said analysis computing device, wherein said analysis computing device is further configured to detect at least one abnormality in at least one of a bearing, a rotor, an amount of mechanical tightness, a mounting, and an air gap of the electric motor.

11. The system of claim 1, further comprising said analysis computing device, wherein said analysis computing device is configured to:
    transmit the audio data to a server computing device; and
    receive responsive data from the server computing device, wherein the responsive data indicates a maintenance action for the electric motor.

12. A method for use in analyzing vibrations of an electric motor, said method is implemented by a conversion computing device including at least one processor, said method comprising:
    measuring, by at least one vibration sensor coupled to the electric motor, vibrations associated with at least one feature of the electric motor and generating at least one analog vibration signal based on the measured vibration information, the vibrations indicative of an operational status of the at least one feature;
    receiving, by the conversion computing device, the at least one analog vibration signal generated by the at least one vibration sensor;
    converting, by the conversion computing device, the analog vibration signal to audio data that includes the measured vibration information; and
    transmitting, by the conversion computing device, the audio data to an analysis computing device.

13. The method of claim 12, wherein transmitting the audio data further comprises transmitting the audio data using a Universal Serial Bus (USB) protocol.

14. The method of claim 12, further comprising removing a direct current offset signal from the at least one analog vibration signal.

15. The method of claim 12, further comprising at least one of scaling the at least one analog signal, filtering out at least one frequency band from the at least one analog signal, and buffering the at least one analog signal.

16. The method of claim 12, wherein the at least one analog vibration signal is a plurality of analog vibration signals, and said method further comprises converting each of the analog vibration signals to a corresponding channel of the audio data.

17. A computer-readable storage device having computer-executable instructions embodied thereon, wherein when executed by a computing device having one or more processors, the computer-executable instructions cause the computing device to:
    measure vibrations associated with at least one feature of an electric motor using at least one vibration sensor coupled to the electric motor, the vibrations indicative of an operational status of the at least one feature;

generate, using the using at least one vibration sensor, at least one analog vibration signal based on the measured vibration information;

receive the at least one analog vibration signal generated by the at least one vibration sensor;

convert the at least one analog vibration signal to audio data that includes the measured vibration information; and transmit the audio data to an analysis computing device.

18. The computer-readable storage device of claim 17, wherein said computer-executable instructions additionally cause the computing device to transmit the audio data using a Universal Serial Bus (USB) protocol.

19. The computer-readable storage device of claim 17, wherein the at least one analog vibration signal is a plurality of analog vibration signals and said computer-executable instructions additionally cause the computing device to convert each of the analog vibration signals to a corresponding channel of the audio data.

* * * * *